Patented Aug. 7, 1928.

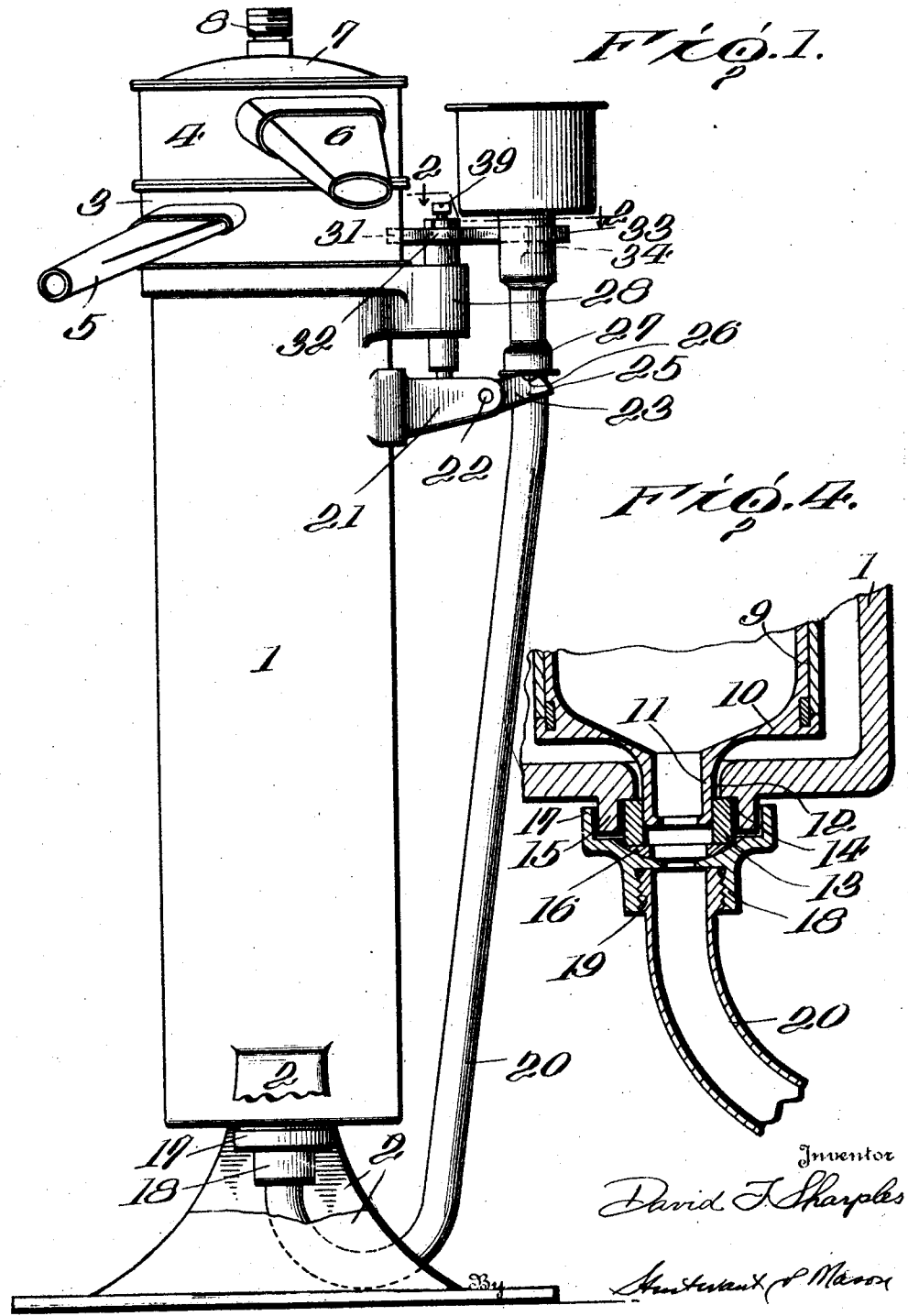

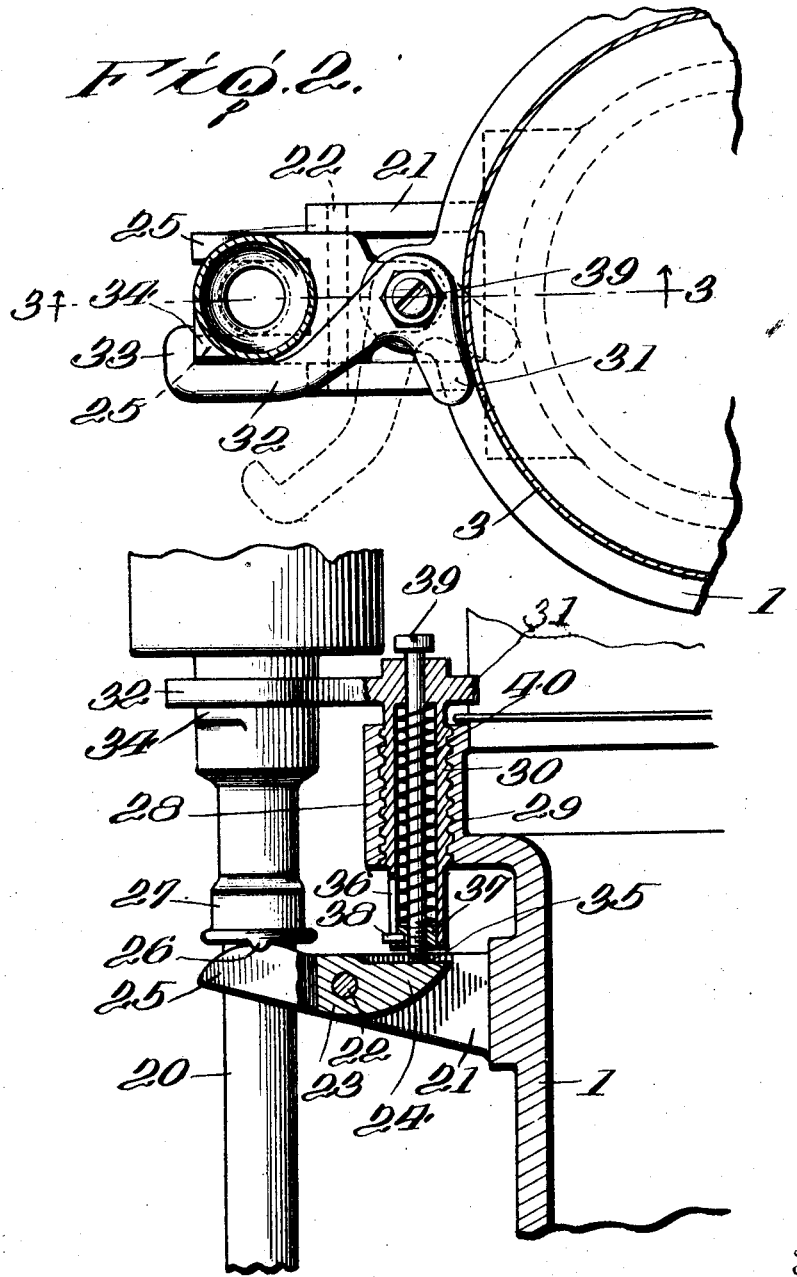

1,679,790

UNITED STATES PATENT OFFICE.

DAVID T. SHARPLES, OF WEST CHESTER, PENNSYLVANIA, ASSIGNOR TO THE SHARPLES SEPARATOR COMPANY, OF WEST CHESTER, PENNSYLVANIA, A CORPORATION OF PENNSYLVANIA.

CENTRIFUGAL SEPARATOR.

Application filed March 21, 1925. Serial No. 17,316.

This invention relates to centrifugal separators, and more particularly to the drag bush regulation, and to certain safety features connected with the drag bush system.

One of the objects of this invention is to provide a centrifugal separator in which the improved drag bush construction is employed to prevent deterioration during shipment, and during intervals between use.

It has been proposed to construct centrifugal separators with bowls suspended from the driving spindle end. The lower end of the bowl is held steady by a "drag bush" which has a loose fit about a bottom boss or nozzle on the bowl so that the bowl nozzle may revolve freely within it without contact. If any disturbance occurs, the bowl may swing slightly from the normal plumb position and into contact with the drag bush, which prevents a farther movement of the bottom nozzle.

The drag bushes heretofore employed have been of material which was subject to drying during storage and shipment. When the machine was placed in service the bush tended to swell as it absorbed parts of the liquid to be separated, and by warping and change of shape interfered with the normal operation of the machine. The present invention sets forth a design of the drag bush system and a drag bush which is of light weight and is not subject to these difficulties.

The drag bush is held between members which offer a frictional resistance to its lateral movement. This resistance has been obtained by spring or other pressure, and it is essential that this pressure and the resistance determined thereby shall be easily regulated. If the friction is too little, the drag bush does not act sufficiently to steady the bowl properly when its axis tends to swing or vibrate out of the normal plumb position; if the friction is too great, a hammer action is set up, which produces a harsh or unsteady motion of the bowl. It has been proposed to regulate this friction by having springs of predetermined strength; but these springs may change their tension or get out of adjustment. This invention proposes to provide means for varying the spring tension on the drag bush so that the friction may be adjusted even while the machine is running.

These centrifugal bowls rotate at a very high speed and if the drag bush and its concomitant elements be removed from around the bottom boss or nozzle before the bowl comes to a standstill, the bowl may swing outward and out of line with the upper or driving bearing, and cause serious damage not only to itself but also to the surroundings. This invention proposes such a construction of the drag bush system, and particularly in conjunction with the spring adjustment referred to, that the drag bush can not be removed from the bottom nozzle so long as the driving connection is in place and the bowl is rotating.

Further, it is necessary to design all parts of such apparatus so that they may be readily dismounted for cleaning. This invention proposes the use of few and simple parts, and the assembly of these parts in such manner that no tools are required for the removal of the elements which may come into contact with the liquid to be separated.

With these and other objects in view, I have shown on the accompanying drawing one form of execution of my invention, in which Figure 1 is a side elevation with a partial section to show the assembly of the various constituent elements;

Fig. 2 is a fragmentary horizontal section at an enlarged scale on the line 2—2 of Fig. 1;

Fig. 3 is a vertical section on the line 3—3 of Fig. 2, and

Fig. 4 is a vertical section on an enlarged scale through the bottom portion of the bowl and feed tube.

The centrifugal separator according to this invention, comprises a stationary bowl jacket 1 having the integral feet 2 formed thereon as a support. The upper portion of the bowl jacket carries the outlet pans 3 and 4, respectively, for the cream and for the skimmed milk. These pans are formed individually, are nested together and on the top of the bowl jacket in the customary manner, and are provided with the respective discharge spouts 5, 6 of well known form. The cover 7 rests on the skimmed milk pan, and has a central aperture to receive a driving spindle 8 for the rotating separator bowl. Since this method of connecting and driving the rotating bowl is old and well known, and forms no part of this invention, it is unnecessary to show or describe it in detail. The essence is that the rotating bowl is moved by the driving of this spindle 8.

As more particularly shown in Fig. 4, the rotating bowl 9 has at its bottom a closing member 10, having a central downwardly extending bottom boss or nozzle 11. This bottom boss extends downward through a hole 12 in the bottom of the bowl jacket 1. The drag bush 13 of laminated phenolic condensation material such as micarta, formica, etc., is received between the bottom boss 11 and the walls of a bore hole 14 formed in a projecting boss 15 on the bottom of member 1. This micarta drag bush 13 is formed as a hollow cylinder with two parallel faces at right angles to the cylindrical jacket, and has a central aperture slightly larger than the boss, so that the latter may revolve freely within the bush. A drag bush made of the material stated is, of course, non-metallic, and therefore, during the rotation of the bowl which is made of metal there is no metal to metal contact. In fact, the surface of the bushing made of laminated phenolic condensation material is very similar to that of wood. This drag bush is also very strong, so that it does not become fractured or broken. It is also very light, so that in the rapid rotation of the bowl, there is no hammering. The drag bush is also permanently impervious, and therefore, it neither shrinks, nor does it swell through contact with the milk, or during long periods of idleness. The drag bush necessarily comes in contact with the milk, but when made of the material stated, it does not in any way taint or affect the flavor of the milk.

The feed tube 20 has at its lower upwardly bent end, a screw thread 19 which is received in a bushing 18. This bushing in turn has a cylindrical flange 17, which closely surrounds the boss 15 formed on the bottom of the jacket 1. The upper face of the bushing 18 within the cylindrical flange 17 is formed as a spherical socket to receive a correspondingly shaped self-alining washer 16. The drag bush 13 is therefore held between the bottom of the jacket 1 and the alining washer 16.

Referring more particularly to Fig. 3, it will be seen that the jacket 1 has formed integral therewith or fastened rigidly thereto, a pair of outwardly extending lugs 21 which support a pivot pin 22. Pivotally mounted on this pin is the feed tube lever 23. This lever has an inwardly extending finger 24, as well as a pair of outwardly extending fingers 25, which latter have between them a space for the passage of the upper end of the feed tube 20. A small notch is formed on the top or face of each of the fingers 25 to receive a small lug 26 which is presented on the lower face of the upper portion 27 of the feed tube 20. It is apparent that when the parts are in the position shown in Figures 3 and 4, any upward movement of the fingers 25 will be transmitted to the feed tube 20, and thence to the alining washer 16, and finally to the drag bush 13.

An integrally formed boss 28 of the jacket 1 has a vertical bore-hole therein provided with the internal screw threads 29. Mounted in this bore-hole and engaging this screw thread is an externally screw-threaded bushing 30 which has an integral finger 31 formed at its upper end, together with a second finger 32 having a lug 33 re-bent at right angles at its outer end. In Fig. 2, it will be seen that the fingers 31 and 32 are held in the full line position so long as the cream pan 3 and its spout remain upon the jacket. In this position, furthermore, the finger 32 with its re-bent lug 33 engages and holds the feed tube 20 in the normal or running position, and prevents it from being removed therefrom prior to the disengagement of the pan 3 from the separator jacket. To facilitate the action of the lug 33, a squared projection 34 is formed on the upper portion of the feed tube, and it will be remarked that the tube 20 is prevented from rotating by the support at 25, 26 and at 17, 15. When the pan 3 has been removed—which may only occur after the driving system has been disconnected from the spindle—the fingers 31, 32 may be swung into the position shown in dotted lines in Fig. 2, after which the feed tube 20 may be readily removed for cleaning. During this rotation of the fingers 31 and 32 and the spindle bushing 30 integral therewith, the screw threads on the latter by cooperation with the screw threads 29 on the boss 28 cause the spindle to rise slightly, thus permitting the outer fingers 25 of the feed tube lever 23 to drop and slightly release the feed tube 20.

A further feature is shown in Fig. 3 for adjustment of the pressure given to the drag bush 13. As stated above, any upward pull on the feed tube 20 causes the connecting washer 16 to force the drag bush 13 into frictional engagement with the bottom face of jacket 1. In the present construction, the feed tube lever 23 is held in normal operating position by the pressure of the bolt 35. This bolt is mounted for free movement in the spindle bushing 30, which is hollow for this purpose, and has a slot 36 along one face. The lower end of the bolt 35 is threaded, and passes through a nut 37 having a projecting pin 38 which is received in the slot 36. It is apparent that as the bolt 35 is rotated by its head 39, the nut 37 travels up and down within the spindle bushing 30, but without rotating. The tension spring 40 is placed about the bolt 35 and within an enlargement of the bore of the spindle bushing 30. As the nut 37 moves up and down, the effective pressure exerted by the lower end of the bolt 35 is correspondingly regulated by the compression or release of the spring 40.

After the machine has been in use, the bowl is allowed to come to a standstill. The driving connection at 8 is separated; and the cover 7 and outlet pans 4 and 3 necessarily removed. The fingers 31, 32 are moved into the position shown in dotted lines. The feed tube 20 may now be pulled slightly away from the jacket 1, and lowered. This tube 20 carries with it the drag bush 13 and the alining washer 16. The bowl 9 may be lifted out. All parts of the machine which have been in contact with the liquid are now exposed and may easily be cleaned and scalded. Re-assembly occurs in the reverse manner.

It will be understood that the invention is not limited to the previous construction or details shown, but that any modifications may be made therein within the scope of the appended claims.

Having thus described the invention, what I claim as new and desire to secure by Letters-Patent, is—

1. In a centrifugal separator, a rotatable bowl, a stationary jacket, a bottom boss on said bowl, a drag bush loosely surrounding said boss, a feed tube engaging said drag bush, and means to force said feed tube upward to frictionally engage said drag bush.

2. In a centrifugal separator, a rotating bowl, a stationary jacket, a bottom boss on said bowl, a drag bush surrounding said boss with slight frictional engagement therewith, a feed tube engaging said drag bush, a spring to force said feed tube upward to engage said drag bush between said tube and said jacket, and means to vary the tension of said spring.

3. In a centrifugal separator, a jacket, a discharge pan mounted upon said jacket, a rotating bowl in said jacket and having a driving connection extending through said pan, a feed tube for said bowl, a finger to hold said feed tube in operative position, and means to hold said finger in locking engagement with said tube so long as said pan is mounted upon said jacket.

4. In a centrifugal separator, a rotatable bowl, a bottom boss on said bowl to serve as an inlet, a drag bush loosely surrounding said boss, and a feed tube to deliver liquid to said boss, said tube serving as a frictional retainer for said bush.

5. In a centrifugal separator, a jacket having a bottom aperture with a cylindrical flange thereabout, defining an annular ledge about the aperture, a rotatable bowl having a bottom boss extending loosely through said aperture and beyond said ledge, a feed tube including a bushing having a cylindrical flange to surround said first flange, said bushing presenting a spherical socket opposite said aperture, a washer having a spherical bottom to fit said socket and thereby to aline itself therein, a drag bush having an internal diameter slightly greater than the external diameter of said boss and supported therearound by said washer, said drag bush being frictionally held between said ledge and said washer, and means to adjust the clamping pressure between said washer and ledge upon said drag bush.

6. In a centrifugal separator, a rotatable bowl, a stationary jacket a bottom boss on said bowl, a drag bush loosely surrounding said boss, a feed tube, a bracket on said jacket, a lever pivoted on said bracket, means whereby said lever may engage said feed tube to support the latter, a spring to move said lever to draw the feed tube upwardly to produce a frictional engagement between said feed tube and said drag bush, and means to adjust the tension of said spring.

7. In a centrifugal separator, a jacket, a rotatable bowl, a driving connection for said bowl, a bottom boss on said bowl, a bearing surrounding said boss, a feed tube having means to support said bearing, a member on said jacket to support said feed tube, and a device to maintain said feed tube in supporting relation to said bearing, said device being releasable only after said driving connection has been released from said bowl.

8. In a centrifugal separator, a jacket, a metal bowl rotatively suspended in said jacket and having a boss at the lower end thereof, a non-metallic drag bush surrounding said boss and guiding said bowl in its rotations, said drag bush being formed wholly of laminated phenolic condensation material, which is lighter than the material of the bowl and which is permanently impervious to moisture and the material treated in the bowl, and means for engaging the drag bush for retarding the lateral movement thereof.

9. In a centrifugal separator, a jacket, a metal bowl rotatively suspended in said jacket and having a boss at the lower end thereof, a non-metallic drag bush surrounding said boss and guiding said bowl in its rotations, said drag bush being formed wholly of laminated phenolic condensation material, which is lighter than the material of the bowl and which is permanently impervious to moisture and the material treated in the bowl, means for engaging the drag bush for retarding the lateral movement thereof, and means for varying the retarding action on said drag bush during the operation of the bowl.

In testimony whereof, I affix my signature.

DAVID T. SHARPLES.